United States Patent [19]

Aufrere et al.

[11] Patent Number: 5,692,802
[45] Date of Patent: Dec. 2, 1997

[54] VEHICLE SEAT WITH ADJUSTABLE SEAT PART LENGTH

[75] Inventors: Christophe Aufrere, Marcoussis; Bruno Hamelin, Combs la Ville; Jean-Claude Aumond, Etrechy, all of France

[73] Assignee: Bertrand Faure Equipments SA, Boulogne, France

[21] Appl. No.: 650,526

[22] Filed: May 20, 1996

[30] Foreign Application Priority Data

May 23, 1995 [FR] France ............... 95 06120

[51] Int. Cl.$^6$ ............................................. A46C 1/02
[52] U.S. Cl. .......................................... 297/337; 297/311
[58] Field of Search .................................. 297/337, 311, 297/284.11, 258.1, 284.1, 338, 339, 260.1, 260.2, 330, 313

[56] References Cited

U.S. PATENT DOCUMENTS

| | | |
|---|---|---|
| 4,648,654 | 3/1987 | Voss .......................... 297/337 X |
| 4,687,251 | 8/1987 | Kazaoka et al. .................. 297/337 |
| 5,171,062 | 12/1992 | Courtois . |
| 5,454,624 | 10/1995 | Anglade et al. . |

*Primary Examiner*—Milton Nelson, Jr.
*Attorney, Agent, or Firm*—Larson & Taylor

[57] ABSTRACT

A vehicle seat includes a seat part which is formed by a cushion secured to a first armature itself supported by a second armature on which the backrest is mounted, it being possible for the first armature to be moved back and forth with respect to the second armature. The first armature includes a rear part which is suspended from the second-armature by at least one rear connecting piece, and the first armature further includes a front part which is linked to the second armature by a front mechanism compatible with the rocking motion of the rear part of the first armature. When a user is seated in the seat, the first armature is urged backward by the weight of the user.

9 Claims, 4 Drawing Sheets

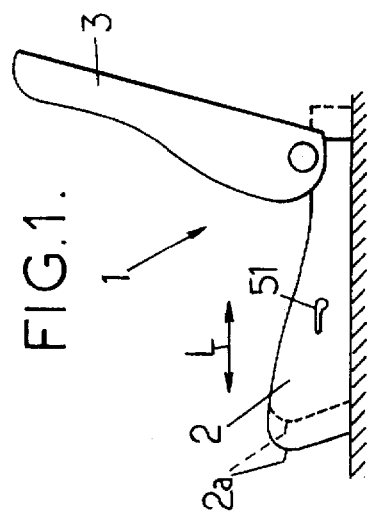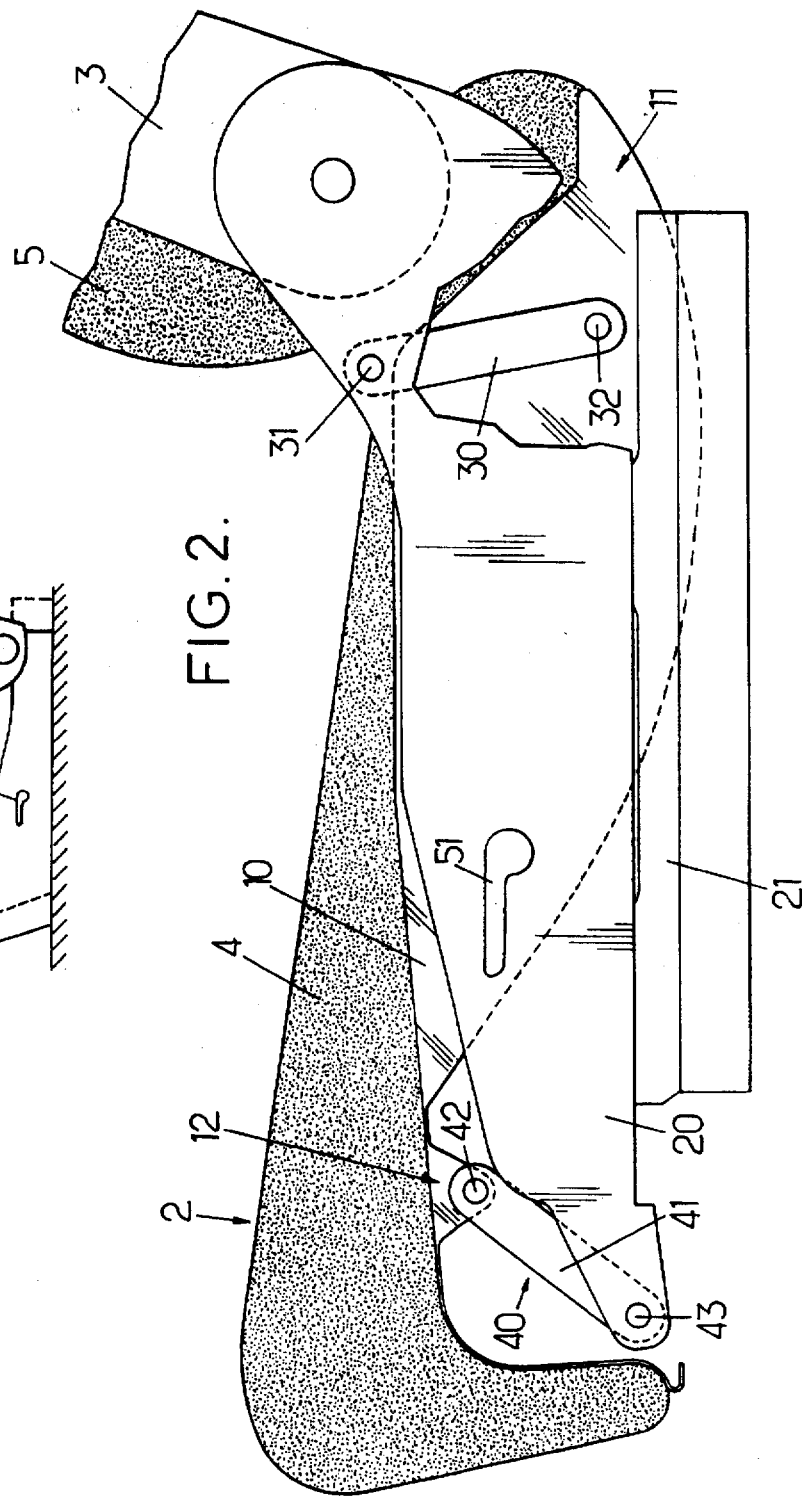

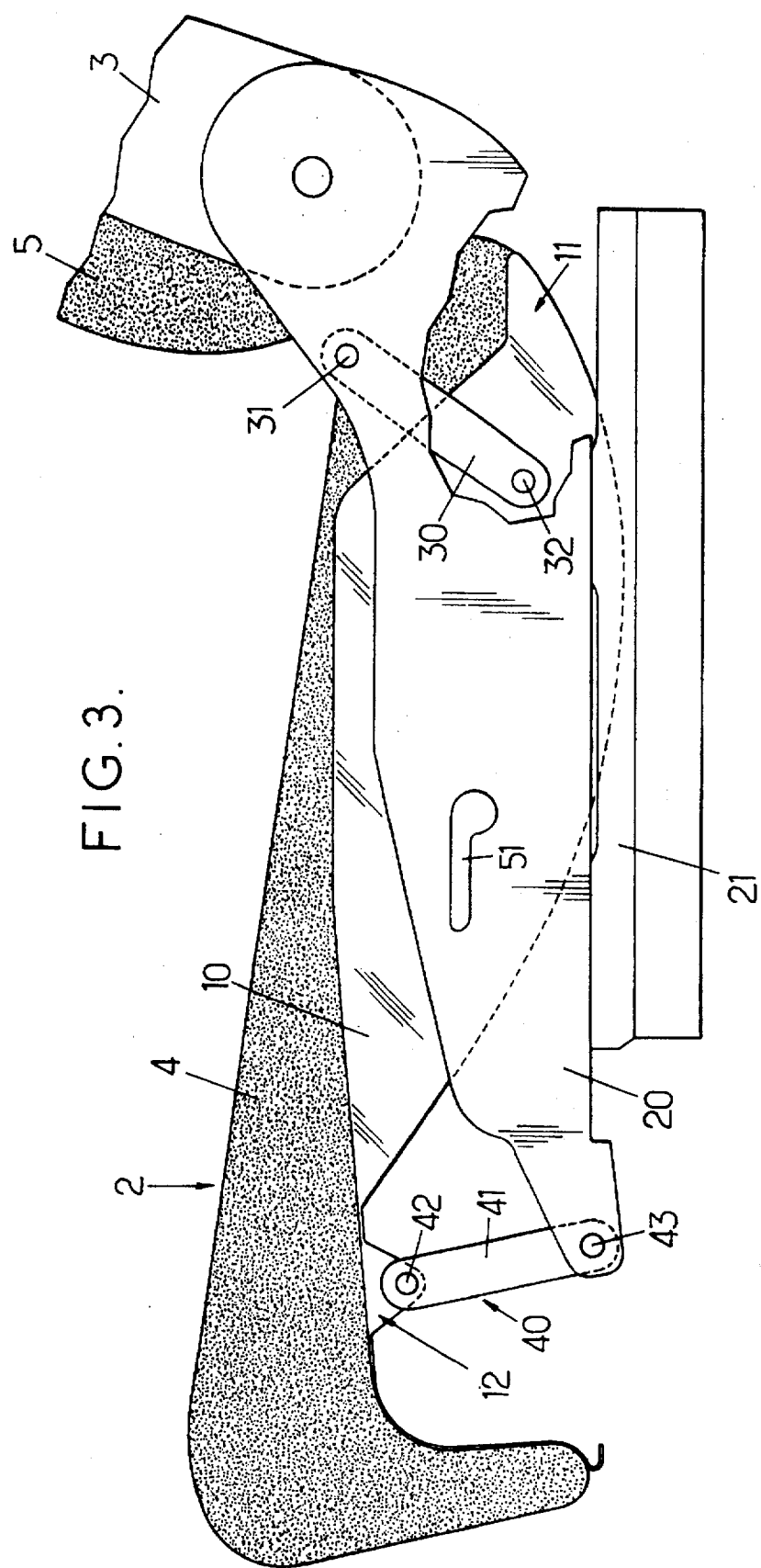

# VEHICLE SEAT WITH ADJUSTABLE SEAT PART LENGTH

FIELD OF THE INVENTION

The invention relates to vehicle seats with adjustable seat part length, and especially to motor vehicle front seats with adjustable seat part length.

BACKGROUND OF THE INVENTION

Vehicle seats are known which include a backrest, and a seat part which is formed by a cushion secured to a first rigid armature, the first armature being itself supported by a second rigid armature on which the backrest is mounted, it being possible for the first armature to be moved back and forth with respect to the second armature in order to adjust the length of the seat part independently of the inclination of the backrest.

While the first armature is being moved back or forth the seat part cushion generally slides under the backrest, and this produces the desired effect of varying this length of the seat part.

In these known vehicle seats, the first armature is mounted on the second armature by means of sliding rails which are liable to jam.

OBJECT AND BRIEF SUMMARY OF THE INVENTION

The object of the invention is, in particular, to alleviate this drawback.

To this end, according to the invention, a seat of the sort in question is essentially one wherein the first armature includes a rear part which is suspended from the second armature by means of at least one rear connecting piece, this rear connecting piece having, on the one hand, an upper portion which is mounted so that it can pivot on the second armature by means of a first pivot and, on the other hand, a lower portion which can be moved back and forth with respect to the second armature and which is mounted so that it can pivot on the first armature by means of a second pivot, the first armature further including a front part which is linked to the second armature by means of a front mechanism compatible with the rocking motion of the rear part of the first armature and allowing said first armature to be moved back and forth, the rear connecting piece and the front mechanism being shaped so that when a user is seated in the seat, the first armature is urged backward by the weight of said user at least as long as said first armature has not been moved back as far as it will go.

By virtue of these provisions, the mechanism for adjusting the length of the seat part has little tendency to jam in operation and in addition does not require such great dimensional accuracy of its constituent parts as a mechanism composed exclusively of sliding rails.

Owing to this great reliability of the adjustment mechanism, when this mechanism includes elements which are identical or similar on either side of the seat, it may be possible not to use a rigid member for linking these elements together, or to use such a rigid linking member only at the front of the seat, something which reduces the complexity of the seat and limits the problems of space taken up under the seat.

In preferred embodiments, recourse is further had to one and/or other of the following provisions:

the rear part of the first armature is suspended from the second armature by means of two rear connecting pieces arranged on either side of the seat;

the front mechanism includes at least one front connecting piece having an upper portion mounted so that it can pivot on one of the two armatures by means of a third pivot and a lower portion which is mounted so that it can pivot on the other of the two armatures by means of a fourth pivot;

the front connecting piece is linked to the first armature by means of the third pivot and to the second armature by means of the fourth pivot, the third pivot being arranged higher up than the second pivot: lengthening the seat part thus causes a certain raising of the front end of the seat part; p1 the front mechanism includes a rail which is mounted on one of the two armatures and along which there slides a member mounted on the other of the two armatures;

the seat includes an operating device which can be actuated in order positively to force a movement of the first armature with respect to the second armature;

the operating device includes an electric motor;

the movement of the first armature with respect to the second armature is brought about by the action of a user of the seat on the seat part cushion, a locking device being provided for immobilizing the first armature with respect to the second armature when the position of the first armature has been adjusted: in this case, when the user of the seat wishes to increase the length of the seat part, he or she unlocks the locking device and then simply pushes the seat cushion forward by leaning against the backrest of the seat with his or her back, and when the user wishes to reduce the length of the seat part, all he or she has to do is to unlock the locking device and then move his or her back forward slightly with respect to the backrest, after which the seat part length will reduce of its own accord simply under the action of the weight of the user on the rear connecting piece, it being possible for this action to be supplemented by the user pushing slightly with his or her feet;

the seat includes two front mechanisms which are arranged on either side of the seat and which each have a locking device, these two locking devices being linked together by a rigid linking member which extends transversely with respect to the seat, in order to synchronize the two locking devices.

BRIEF DESCRIPTION OF THE DRAWINGS

Further features and advantages of the invention will become clear during the following detailed description of a number of its embodiments, given by way of nonlimiting examples with reference to the attached drawings.

In the drawings:

FIG. 1 is a diagrammatic view of a seat according to the invention,

FIG. 2 is a partial cutaway view of the seat of FIG. 1, when the seat part is adjusted to have its minimum length, FIG. 3 is a view similar to FIG. 2 when the seat part is adjusted to have its maximum length.

MORE DETAILED DESCRIPTION

Figure 4:
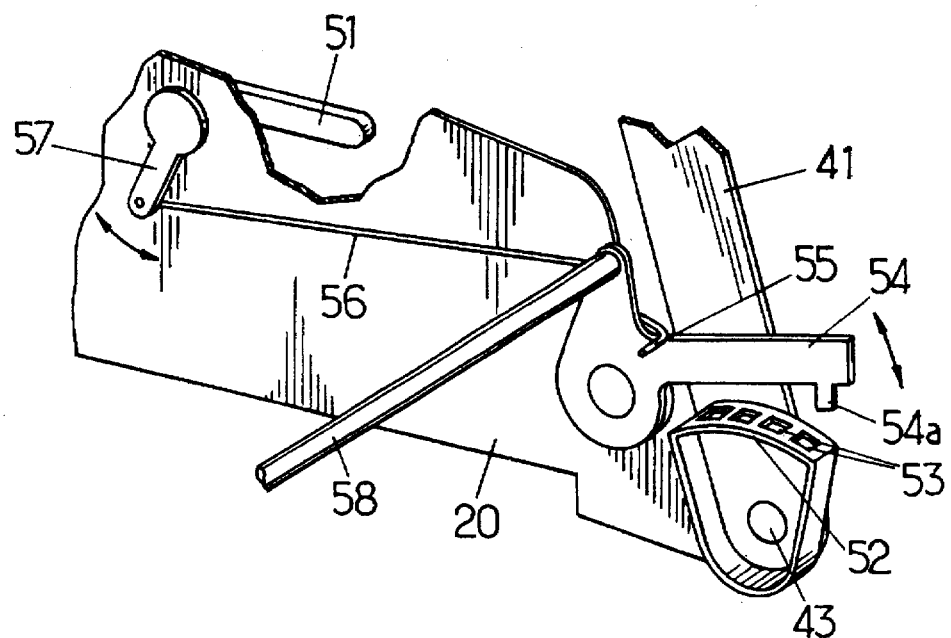
FIG. 4 is a detail view showing one example of a locking mechanism that can be used in the seat of FIGS. 1 to 3.

In the various figures, the same references denote identical or similar elements.

As represented diagrammatically in FIG. 1, the invention relates to a vehicle seat 1, especially to a motor vehicle front seat.

This seat includes a seat part 2 and a backrest 3 generally mounted so that it can pivot with respect to the seat part.

The seat part 2 of the seat has an adjustable length, that is to say that its front end 2a can be moved in a longitudinal direction L without moving the backrest 3.

The front end 2a of the seat part can thus be moved forward as far as an extreme position represented in solid line in FIG. 1, and backward as far as an extreme position represented in dotted line in FIG. 1.

The mechanism allowing the length of the seat part to be adjusted is represented in greater detail in FIGS. 2 and 3 where it is possible to see that the cushion 4 forming the seat part of the seat is secured to a first rigid armature 10 which can be moved-back and forth and which is supported by a second rigid armature 20 which is stationary and on which the backrest 3 is mounted.

In the specific example represented in the drawings, the first armature 10 is in the form of a sheet metal bucket, and the second armature 20 includes two metal cheeks on either side of the first armature, which cheeks are generally fixed to rails 21 which allow the longitudinal position of the whole seat to be adjusted.

The first armature 10 has a rear part 11 which is suspended from the second armature by means of two rear connecting pieces 30 arranged on either side of the seat.

Each rear connecting piece 30 is mounted so that it can pivot on the second armature at its upper end by means of a first pivot 31, and it is mounted so that it can pivot on the rear part 11 of the first armature at its lower end by means of a second pivot 32. The first pivots 31 on either side of the seat have aligned axes of rotation, and the second pivots 32 on either side of the seat also have aligned axes of rotation.

Furthermore, the first armature 10 has a front part 12 which is linked to the second armature by means of a front mechanism 40 compatible with the rocking motion of the rear part 11 and allowing the first armature to be moved back and forth.

In the example of FIGS. 1 and 2, the mechanism 40 includes two front connecting pieces 41 which are arranged on either side of the seat.

Each front connecting piece 41 is mounted at its upper end on the front part 12 of the first armature, by means of a third pivot 42, and it is mounted at its lower end on the second armature by means of a fourth pivot 43. The third pivots 42 on either side of the seat have aligned axes of rotation, and the fourth pivots 43 on either side of the seat also have aligned axes of rotation.

As an option, the third pivot 42 could link the upper end of the front connecting piece 41 to the second armature 20, the fourth pivot 43 then linking the lower end of the front connecting piece 41 to the first armature 10.

By virtue of the rear connecting piece 30 and front connecting piece(s) 41, the seat part cushion 4 can be moved back and forth with the first armature 10.

When the first armature 10 is moved back as far as it will go, as represented in FIG. 2, a rear portion of the seat part cushion 4 is arranged under the covering 5 of the backrest, and the first and second pivots 31, 32 are aligned substantially vertically or possibly aligned in a direction which is inclined with respect to the vertical.

In any case, when the first armature 10 is moved back as far as it will go it is either in a position close to a position of stable equilibrium or in a position against a back stop being urged backward by the weight of the user sitting in the seat, and this is the case irrespective of the front mechanism 40 used.

From the position represented in FIG. 2, in order to lengthen the seat part of the seat, the user seated in the seat actuates a lever handle 51 which unlocks the first armature 10 with respect to the second armature 20, by means of a locking device which will be explained later.

After the first armature has been unlocked, the user pushes the seat part cushion 4 forward by leaning against the backrest 3 of the seat with his or her back, so that the assembly formed of the seat part cushion 4 and the first armature 10 moves forward, as represented in FIG. 3.

During this motion, the rear portion of the seat part cushion 4 moves under the lower end of the covering 5 of the backrest.

Furthermore, in the specific example represented in the drawings, because the first armature 10 is mounted at the front on the third pivot 42 and at the back on the second pivot 32 which is lower down than the third pivot, the lengthening of the seat part 2 is accompanied by a certain raising of the front end of this seat part.

The direction defined by the second and third pivots 32, 42 could, for example, have an inclination of approximately 15 to 20 degrees, especially approximately 17 degrees, with respect to the horizontal.

Because users who have a long femur generally also have a long tibia, this arrangement makes it possible to increase the comfort of users and limit the number of adjustments that have to be carried out to tailor the seat to a given user.

When the first armature 10 has been moved forward from the position represented in FIG. 2, it is urged backward by the weight of the user sitting in the seat, and this is the case irrespective of the front mechanism 40 used.

When the first armature 10 is in a forward position, as represented in FIG. 3, the user can easily reduce the length of the seat part of the seat by acting on the lever handle 51 in order to unlock the first armature 10 with respect to the second armature 20, and by moving his or her back forward slightly with respect to the backrest.

The first armature 10 and the seat part cushion 4 then move naturally backward, thereby reducing the length of the seat part, because of the weight of the user which is acting on the seat part cushion 4 close to the rear part 11 of the first armature and which tends to return the rear connecting pieces 30 to a position of stable equilibrium.

By way of nonlimiting example, FIG. 4 diagrammatically represents a locking device 50 that can be used in the seat of FIGS. 1 to 3.

This device includes, on either side of the seat, two rigid locking members 52, just one of which has been represented. These locking members are secured respectively to the two front connecting pieces 41 and have holes 53 directed radially with respect to the common axis of rotation of the fourth pivots 43.

The first armature 10 is locked with respect to the second armature 20 by engaging the ends 54a of two hooks 54 (just one of which has been represented) respectively in the holes of the two locking members 52. The two hooks 54 are mounted so that they can rotate on the two lateral cheeks of the second armature 20 about a common axis of rotation which is parallel to the axis of rotation of the fourth pivots 43.

At least one of the two hooks 54 is urged toward the locking member 52 by a spring 55 so that it engages in one of the holes 53 of this locking member, and it can, furthermore, come out of the holes 53 through action of a cable 56 controlled by the pivoting of a lever 57 secured to the lever handle 51.

The other hook 54 is linked to the aforementioned hook 54 by a rigid link rod 58 which extends transversely 15 through the seat part of the seat, in order to synchronize the motion of the two hooks.

The locking device 50 could optionally be provided on just one side of the seat.

It goes without saying that instead of including the locking device operated by the lever handle 51, the seat of FIGS. 1 to 3 could include an operating device, actuation of which positively causes the relative movement of the armatures 10 and 20 without the user of the seat having to act directly on the cushion 4 of the seat part. This actuation may take place manually by means of an articulation mechanism or automatically by means of an electric motor.

Figure 6:
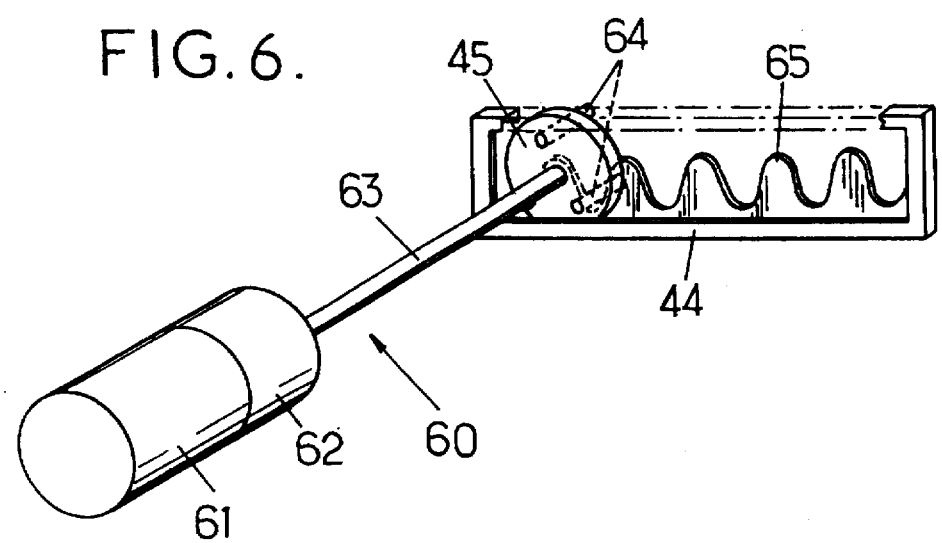
FIG. 6 is a diagrammatic view illustrating one example of an operating device allowing the seat part length of the seat of FIG. 5 to be adjusted.
Figure 5:
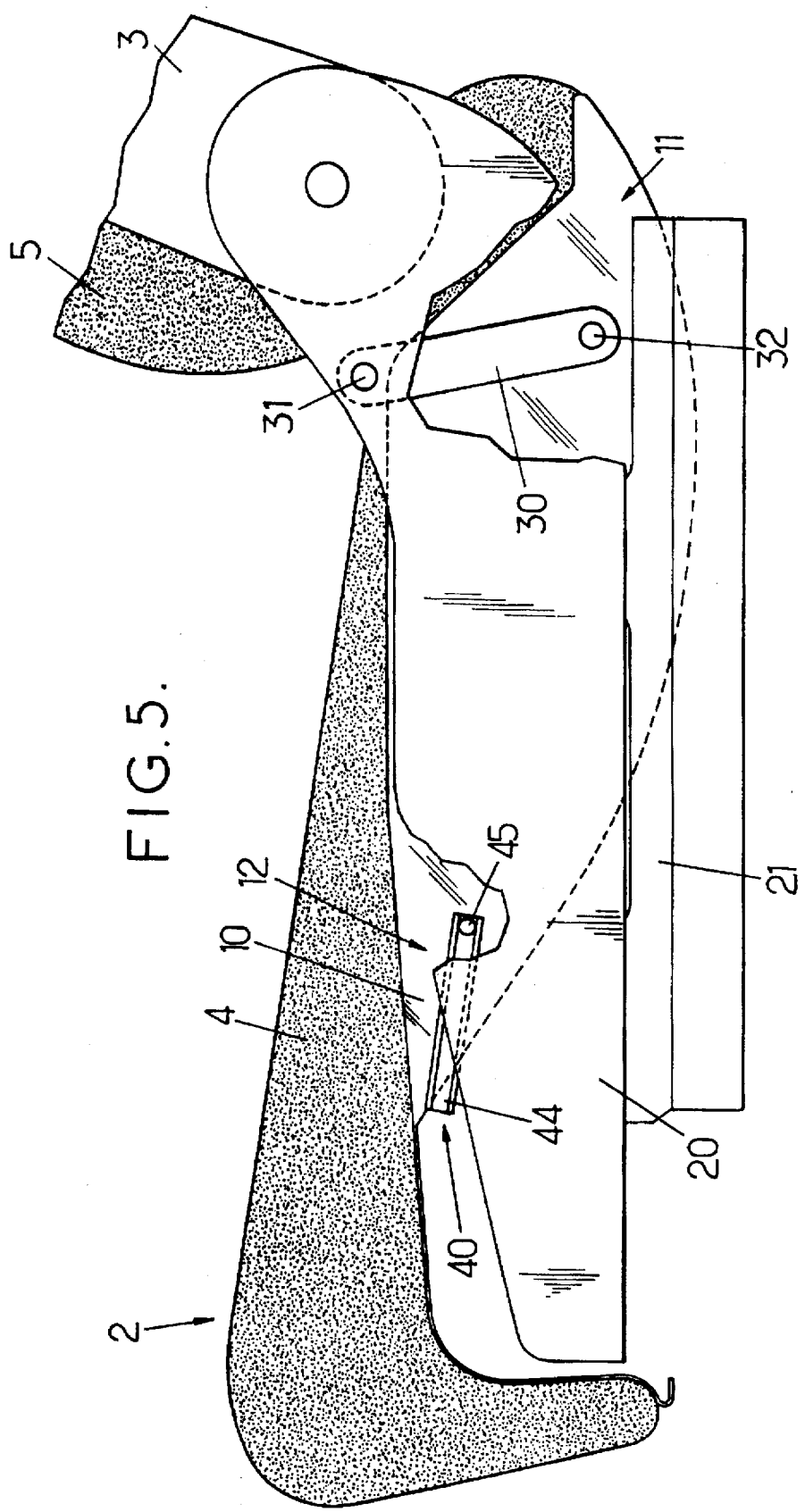
FIG. 5 is a view similar to FIG. 2 showing another embodiment of the invention.

The seat represented in FIGS. 5 and 6 is similar to the one in FIGS. 1 to 3 and also works in a similar way. It includes a backrest 3 identical or similar to the one in FIGS. 1 to 3, and a seat part 2 consisting, as before, of a first armature 10 which is secured to a cushion 4 and which is mounted on a second armature 20 itself carried by rails 21.

As in the example of FIGS. 1 to 3, the rear part 11 of the first armature is suspended from the second armature by means of two rear connecting pieces 30.

By contrast, the front mechanism no longer includes any connecting pieces, but includes two lateral rails 44 which are secured to the two respective lateral cheeks of the second armature 20.

Each of the two rails 44 takes a roller 45 or some other pivoting member which is mounted on the front part 12 of the first armature 10 and which runs along said rail.

The rail 44 may be straight, as in the example represented, but it may instead have a curved shape. It may advantageously be inclined slightly upward in the forward direction, as represented in FIG. 5, which causes the front part of the seat part cushion 4 to be raised when the seat part length increases.

As represented diagrammatically in FIG. 6, the relative movement between the first and second armatures 10 and 20 may be bought about by an operating device 60 which may include:

an electric motor 61 borne by the first armature 10, reduction gear 62 driven by the motor 61, a disk driven in rotation by the reduction gear 62 by means of a shaft 63 and having two axial pegs 64, and a rack 65 secured to the second armature 20 and interacting with the pegs 64.

The rack 65 may be arranged close to one of the two rails 45, following the shape of this rail, or alternatively, as represented in FIG. 6, it may constitute part of this rail, the disk which has the pegs 64 then constituting one of the rollers 45.

In the alternative form represented in FIGS. 5 and 6, the length of the seat part is adjusted simply by making the motor 61 rotate by means of a push-button (not represented).

As an option, instead of the operating device 60 described hereinabove, the seat of FIG. 5 could include a manual operating device giving positive control over the seat part length, or alternatively a simple locking device, in which case adjusting the length of the seat part would involve the user of the seat pushing the cushion 4 of the seat part forward or backward by acting directly on this cushion 4 using muscular effort or his or her weight.

We claim:

1. A vehicle seat comprising:

a backrest;

a seat part including a cushion, a first rigid armature to which said cushion is secured, and a second rigid armature to which said backrest is mounted; and a mounting means for mounting said first armature relative to said second armature (a) for movement of said first armature in a back and forth motion relative to said second armature in order to adjust a length of said seat part independently of an inclination of said backrest and (b) for urging of said first armature backward when a user is seated in said vehicle seat by a weight of the user up to a limit of movement of said first armature, said mounting means including a rear connecting piece by which a rear part of said first armature is suspended from said second armature, said rear connecting piece including (a) an upper portion which is pivotally mounted to said second armature by a first pivot, and (b) a lower portion which is pivotally mounted to said first armature by a second pivot such that said lower portion is movable back and forth with respect to said second armature and hence said rear part of said first armature moves in a rocking motion relative to said second armature, and a front mechanism which links a front part of said first armature to said second armature for movement of said first armature relative to said second armature in a back and forth motion compatible with the rocking motion of said rear part of said first armature.

2. The seat as claimed in claim 1, in which the rear part of the first armature is suspended from the second armature by two of said rear connecting pieces arranged on either side of the seat.

3. The seat as claimed in claim 1, in which the front mechanism includes a front connecting piece having a second upper portion mounted so that said second upper portion can pivot on one of the two armatures by a third pivot, and a second lower portion which is mounted so that said second lower portion can pivot on the other of the two armatures by a fourth pivot.

4. The seat as claimed in claim 3, in which the front connecting piece is linked to the first armature by the third pivot and to the second armature by the fourth pivot, the third pivot being arranged higher up than the second pivot.

5. The seat as claimed in claim 1, in which the front mechanism includes a rail which is mounted on one of the two armatures and along which there slides a member mounted on the other of the two armatures.

6. The seat as claimed in claim 1, including an operating device which can be actuated in order positively to force a movement of the first armature with respect to the second armature.

7. The seat as claimed in claim 6, in which the operating device includes an electric motor.

8. The seat as claimed in claim 1, in which the movement of the first armature with respect to the second armature is brought about by the action of a user of the seat on the seat part cushion, and further including a locking device for immobilizing the first armature with respect to the second armature when the position of the first armature has been adjusted.

9. The seat as claimed in claim 8, further including two front mechanisms which are arranged on either side of the seat and which each have a respective said locking device, these two locking devices being linked together by a rigid linking member which extends transversely with respect to the seat, in order to synchronize the two locking devices.

* * * * *